(12) United States Patent
Avraham (10) Patent No.: US 11,939,204 B2
(45) Date of Patent: Mar. 26, 2024

(54) JUICE DISPENSER

(71) Applicant: Iris Avraham, Yehud-Monoson (IL)

(72) Inventor: Iris Avraham, Yehud-Monoson (IL)

( * ) Notice: Subject to any disclaimer, the term of this patent is extended or adjusted under 35 U.S.C. 154(b) by 0 days.

(21) Appl. No.: 18/070,671

(22) Filed: Nov. 29, 2022

(65) Prior Publication Data
US 2023/0174364 A1    Jun. 8, 2023

(30) Foreign Application Priority Data

Dec. 6, 2021 (IL) .......................................... 288715

(51) Int. Cl.
B67D 3/00 (2006.01)

(52) U.S. Cl.
CPC ......... B67D 3/0022 (2013.01); B67D 3/0012 (2013.01); B67D 3/0035 (2013.01); B67D 3/0061 (2013.01); B67D 2210/00099 (2013.01)

(58) Field of Classification Search
CPC ... A47J 31/401; B67D 3/0022; B67D 3/0012; B67D 3/0035; B67D 3/0061; B67D 2210/00099
USPC ......... 222/21, 636, 344, 367, 129, 132, 135, 222/138
See application file for complete search history.

(56) References Cited

U.S. PATENT DOCUMENTS

| | | | | |
|---|---|---|---|---|
| 140,629 A | * | 7/1873 | Johnson ............... | B67D 3/0009 222/131 |
| 177,970 A | * | 5/1876 | Stapler ............... | B65D 81/3222 222/129 |
| 501,007 A | * | 7/1893 | Green ..................... | F16K 49/00 422/243 |
| 652,271 A | * | 6/1900 | Howe ................ | B65D 81/3222 222/129 |
| 939,594 A | * | 11/1909 | Eulper et al. ................. | 222/129 |
| 948,883 A | * | 2/1910 | Hughes .............. | B65D 81/3222 137/364 |
| 1,078,214 A | * | 11/1913 | Patnaude ...................... | 222/129 |
| 1,368,687 A | * | 2/1921 | Bennetts ................... | B01L 9/00 222/129 |
| 1,369,595 A | * | 2/1921 | Wood ................... | A47K 5/1214 137/259 |
| 1,607,347 A | * | 11/1926 | Hemman .............. | F25D 31/002 62/460 |
| 1,715,922 A | * | 6/1929 | Hix ...................... | B67D 3/0012 222/506 |

(Continued)

FOREIGN PATENT DOCUMENTS

WO    WO-2011157759 A1  * 12/2011
WO    WO-2014006325 A1  *  1/2014

(Continued)

*Primary Examiner* — Paul R Durand
*Assistant Examiner* — Michael J. Melaragno
(74) *Attorney, Agent, or Firm* — AlphaPatent Associates Ltd.; Daniel J. Swirsky (57) ABSTRACT

A juice dispenser, including a first tank including a first inlet, a first outlet, and a first faucet for the first outlet, and a second tank surrounding first tank, and including a second inlet, a second outlet, and a second faucet for the second outlet, thereby the second tank is not heat insulated, and the second tank insulates the first tank and thereby after inserting heated water into the tanks, adjustable opening of the first and second faucets dispenses the water to a receptacle mixed at an adjustable temperature.

10 Claims, 6 Drawing Sheets

(56) References Cited

U.S. PATENT DOCUMENTS

| | | | | |
|---|---|---|---|---|
| 1,721,137 | A * | 7/1929 | Schmidt | A61C 5/68 222/363 |
| 1,732,996 | A * | 10/1929 | Wandel | F25D 3/08 220/592.12 |
| 1,885,201 | A * | 11/1932 | Holley | G07F 11/44 222/129 |
| 1,893,391 | A * | 1/1933 | Berry | G01F 11/44 222/129 |
| 2,154,283 | A * | 4/1939 | Reisdorf | G01F 11/24 222/196 |
| 2,327,432 | A * | 8/1943 | Johnson | B67D 3/0012 222/130 |
| 2,533,930 | A * | 12/1950 | Harr | B67D 3/0012 99/283 |
| 2,657,554 | A * | 11/1953 | Hull | B67D 3/0009 62/391 |
| 2,661,870 | A * | 12/1953 | Huenergardt | B65D 81/3227 401/47 |
| 2,665,034 | A * | 1/1954 | Harrison | B67D 3/0012 222/145.7 |
| 2,673,005 | A * | 3/1954 | Brown | B67D 3/0012 222/355 |
| 3,433,464 | A * | 3/1969 | Duke | A01J 13/00 366/156.1 |
| 3,656,518 | A * | 4/1972 | Aronson | B65B 1/16 141/81 |
| 3,731,848 | A * | 5/1973 | Nakanishi | B65D 81/3216 222/129 |
| 3,735,899 | A * | 5/1973 | Rollinson | G01F 11/24 222/368 |
| 4,004,716 | A * | 1/1977 | Steels | A23G 3/16 222/135 |
| 4,245,680 | A * | 1/1981 | Greenfield, Jr. | A47J 31/401 141/82 |
| 4,358,029 | A * | 11/1982 | Yomoda | A47J 27/14 99/289 R |
| 4,433,796 | A * | 2/1984 | Brooks, Jr. | B65D 83/384 239/305 |
| 4,643,335 | A * | 2/1987 | Carnisio | A23G 9/282 222/255 |
| 4,784,297 | A * | 11/1988 | Katz | B67D 3/00 222/161 |
| 5,289,951 | A * | 3/1994 | Burrows | B67D 3/0009 222/146.6 |
| 5,297,700 | A * | 3/1994 | Burrows | B67D 3/0038 222/146.6 |
| 5,328,050 | A * | 7/1994 | Hyatt | B67D 3/0022 222/129 |
| 5,366,619 | A * | 11/1994 | Matsui | C02F 9/20 210/139 |
| 5,370,276 | A * | 12/1994 | Burrows | B67D 3/0009 222/146.6 |
| 5,390,826 | A * | 2/1995 | Burrows | B67D 1/0861 222/146.6 |
| 5,797,313 | A * | 8/1998 | Rothley | A47J 31/402 366/205 |
| 6,085,540 | A * | 7/2000 | Davis | C02F 9/20 62/392 |
| 6,550,647 | B1 * | 4/2003 | Kunz | B65D 81/3227 222/129 |
| 6,837,397 | B2 * | 1/2005 | Lassota | A47J 31/404 222/413 |
| 8,074,825 | B1 * | 12/2011 | Ziegler | B65D 81/3261 220/523 |
| 8,444,012 | B2 * | 5/2013 | Bergdahl | A47J 31/407 222/145.5 |
| 9,648,977 | B2 * | 5/2017 | Carbone | A47J 31/404 |
| 2002/0043070 | A1* | 4/2002 | Bedard | B67D 1/0043 62/3.64 |
| 2003/0071061 | A1* | 4/2003 | Lassota | A47J 31/404 222/129.3 |
| 2006/0034987 | A1* | 2/2006 | Thakur | A47J 31/401 426/477 |
| 2007/0261566 | A1* | 11/2007 | Varney | A47J 31/404 99/300 |
| 2008/0169310 | A1* | 7/2008 | Mata | B67D 3/0035 222/481 |
| 2009/0214742 | A1* | 8/2009 | Peden | A47J 31/41 222/64 |
| 2012/0088022 | A1* | 4/2012 | Carbone | A47J 31/40 99/275 |
| 2012/0240786 | A1* | 9/2012 | Chang | A47J 31/401 99/326 |
| 2012/0279990 | A1* | 11/2012 | Werner | B05B 11/1083 222/145.5 |
| 2012/0325852 | A1* | 12/2012 | Veltrop | B67D 3/0083 222/144.5 |
| 2014/0007978 | A1* | 1/2014 | Cheikh | A47J 47/16 141/98 |
| 2014/0144928 | A1* | 5/2014 | Dobbins | B67D 1/108 222/142 |
| 2016/0109273 | A1* | 4/2016 | LaFosse | G01F 11/24 222/71 |
| 2016/0353917 | A1* | 12/2016 | Carbone | A47J 31/404 |
| 2019/0069712 | A1* | 3/2019 | Comana | A23L 2/39 |
| 2019/0375625 | A1* | 12/2019 | Ewing | B67D 3/0061 |
| 2021/0235916 | A1* | 8/2021 | Arora | A23L 5/19 |
| 2022/0322866 | A1* | 10/2022 | Singer | A47J 31/002 |
| 2023/0174364 | A1* | 6/2023 | Avraham | A47J 31/404 222/146.1 |

FOREIGN PATENT DOCUMENTS

| | | | |
|---|---|---|---|
| WO | WO-2014009339 | A2 * | 1/2014 |
| WO | WO-2014045114 | A2 * | 3/2014 |
| WO | WO-2019121499 | A1 * | 6/2019 |

\* cited by examiner

JUICE DISPENSER

CROSS-REFERENCE TO RELATED APPLICATIONS

This application claims the benefit of priority from Israel Patent Application No. 288715, filed Dec. 6, 2021, the disclosure of which is incorporated herein by reference.

TECHNICAL FIELD

The invention relates to the field of baby feeding. More particularly, the invention relates to a method and apparatus for producing the juice and dispensing it.

BACKGROUND

To prepare baby food, for example when traveling in a car or when away from home, it is necessary to take both the thermos and another bottle of cold boiled water to prepare the baby food. It is necessary to transfer to the baby bottle some of the hot water in the thermos and some of the cold boiled water in another bottle to reach a selected water temperature suitable for feeding the baby.

While pouring water from the bottle and thermos into the baby's feeding bottle, there may be a leak of water out. When pouring water into a baby bottle from a thermos and a bottle of cold water, there is a problem to obtain the desired temperature of the water. Carrying a thermos separately and a bottle of water separately is cumbersome and requires a relatively large amount of space in the user's bag. Further, the cold water as well must be boiled for sterilization.

When opening the thermos, \ the bottle of cold water allow bacteria to enter the baby's feeding bottle.

There is a long felt need to provide a solution to the above-mentioned and other problems of the prior art.

SUMMARY

A juice dispenser is provided in accordance with an embodiment of the invention, including a first tank and a second tank surrounding first tank, thereby the second tank is not heat insulated, and the second tank insulates the first tank.

BRIEF DESCRIPTION OF THE DRAWINGS

Embodiments, features, and aspects of the invention are described herein in conjunction with the following drawings in which.

The drawings are not necessarily drawn to scale.

DETAILED DESCRIPTION

The invention will be understood from the following detailed description of embodiments of the invention, which are meant to be descriptive and not limiting. For the sake of brevity, some well-known features are not described in detail.

The reference numbers have been used to point out elements in the embodiments described and illustrated herein, in order to facilitate the understanding of the invention. They are meant to be merely illustrative, and not limiting. Also, the foregoing embodiments of the invention have been described and illustrated in conjunction with systems and methods thereof, which are meant to be merely illustrative, and not limiting.

Figure 1:
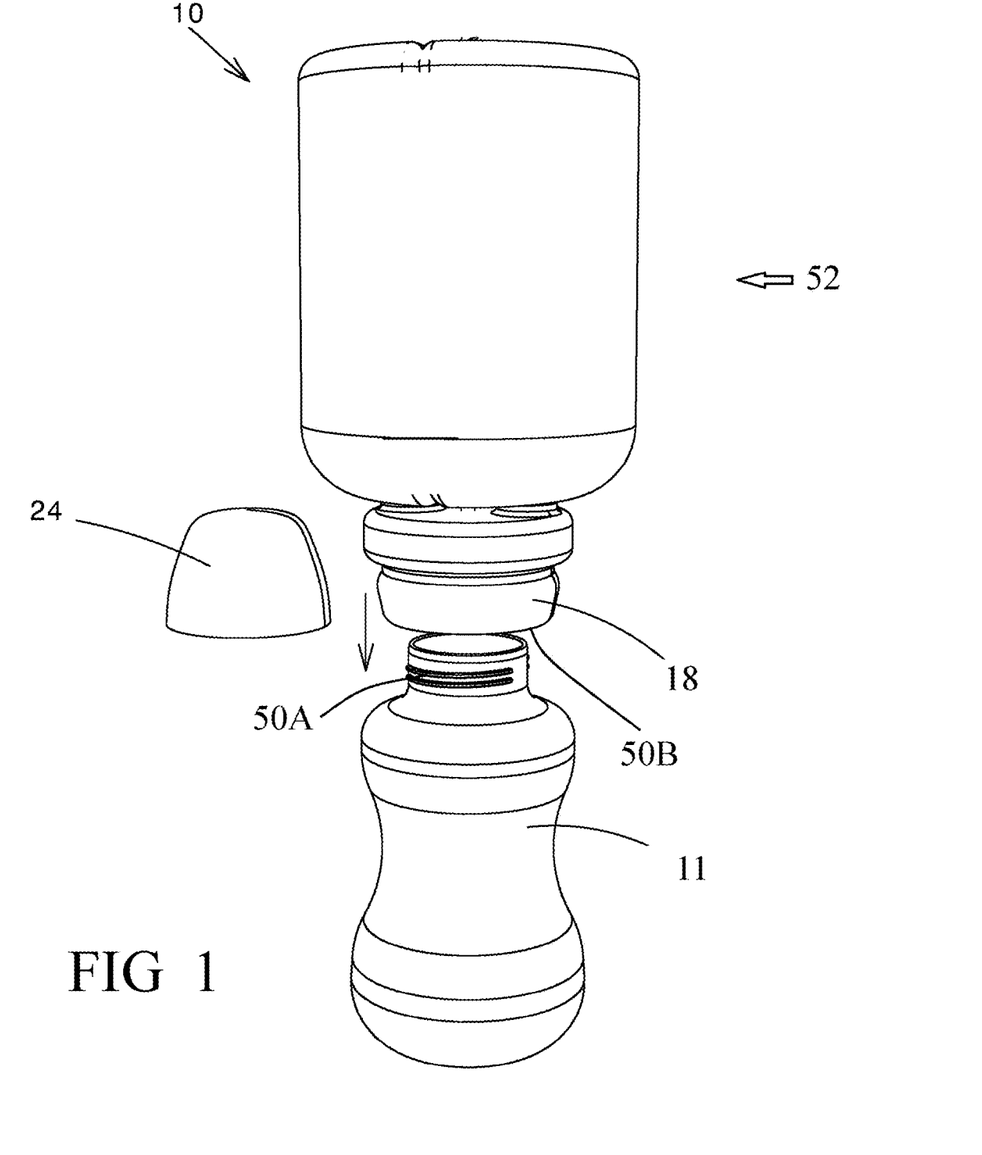
FIG. 1 is a perspective view of a baby juice dispenser according to one embodiment, prior to use.

FIG. 1 is a perspective view of a baby juice dispenser according to one embodiment, prior to use.

A baby juice dispenser 10 according to one embodiment includes a complex tank 52 ending with a female thread 50B, for connecting a male thread 50A of a baby bottle 11, thus the dispensing to baby bottle 11 is sterilized and without spilling.

Figure 2:
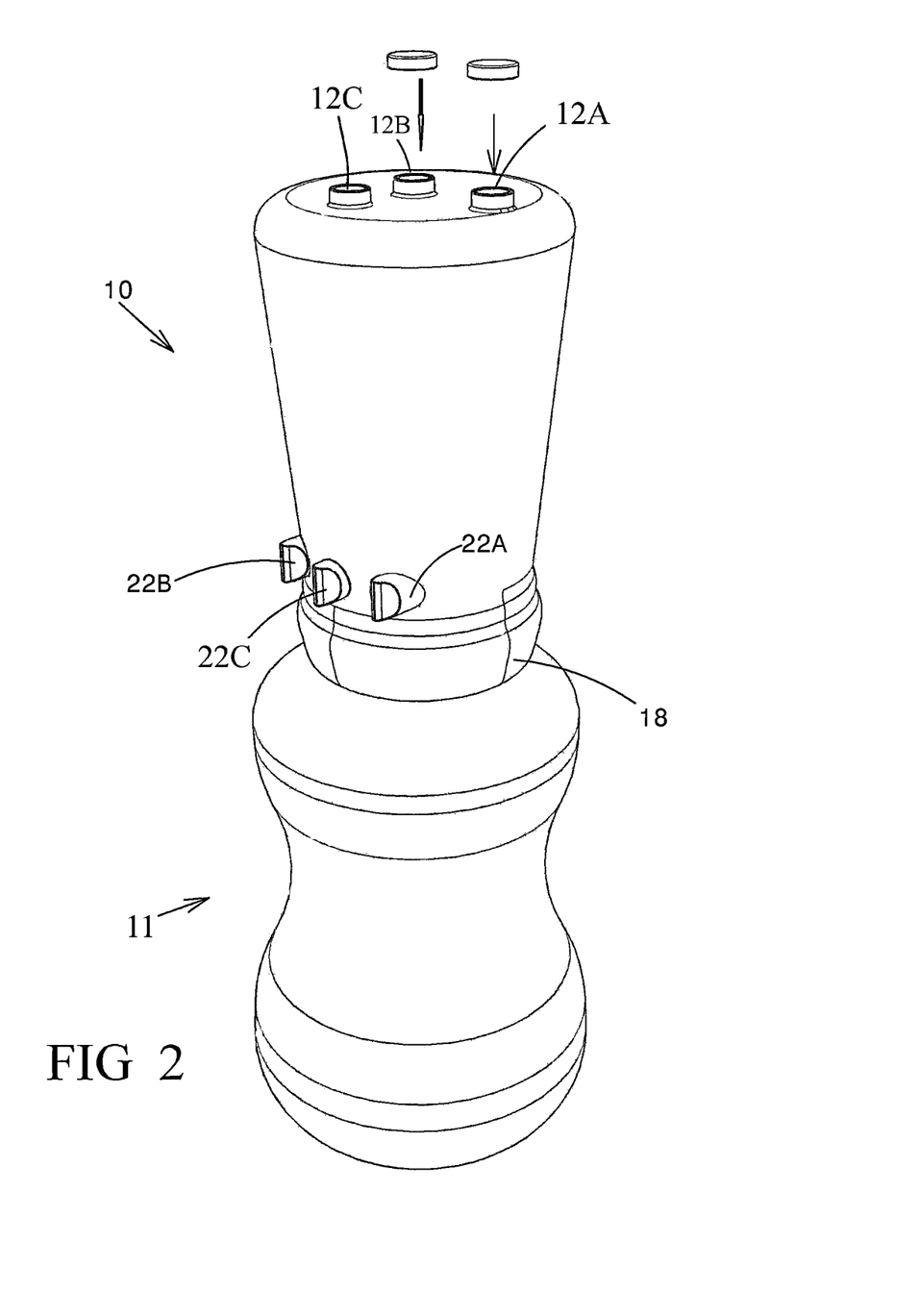
FIG. 2 is a perspective view of the baby juice dispenser of FIG. 1, being connected to the baby bottle of FIG. 1.

FIG. 2 is a perspective view of the baby juice dispenser of FIG. 1, being connected to the baby bottle of FIG. 1.

Baby juice dispenser 10 includes an inlet 12A, for inserting boiled hot water; and an inlet 12C, for inserting powder.

Figure 3:
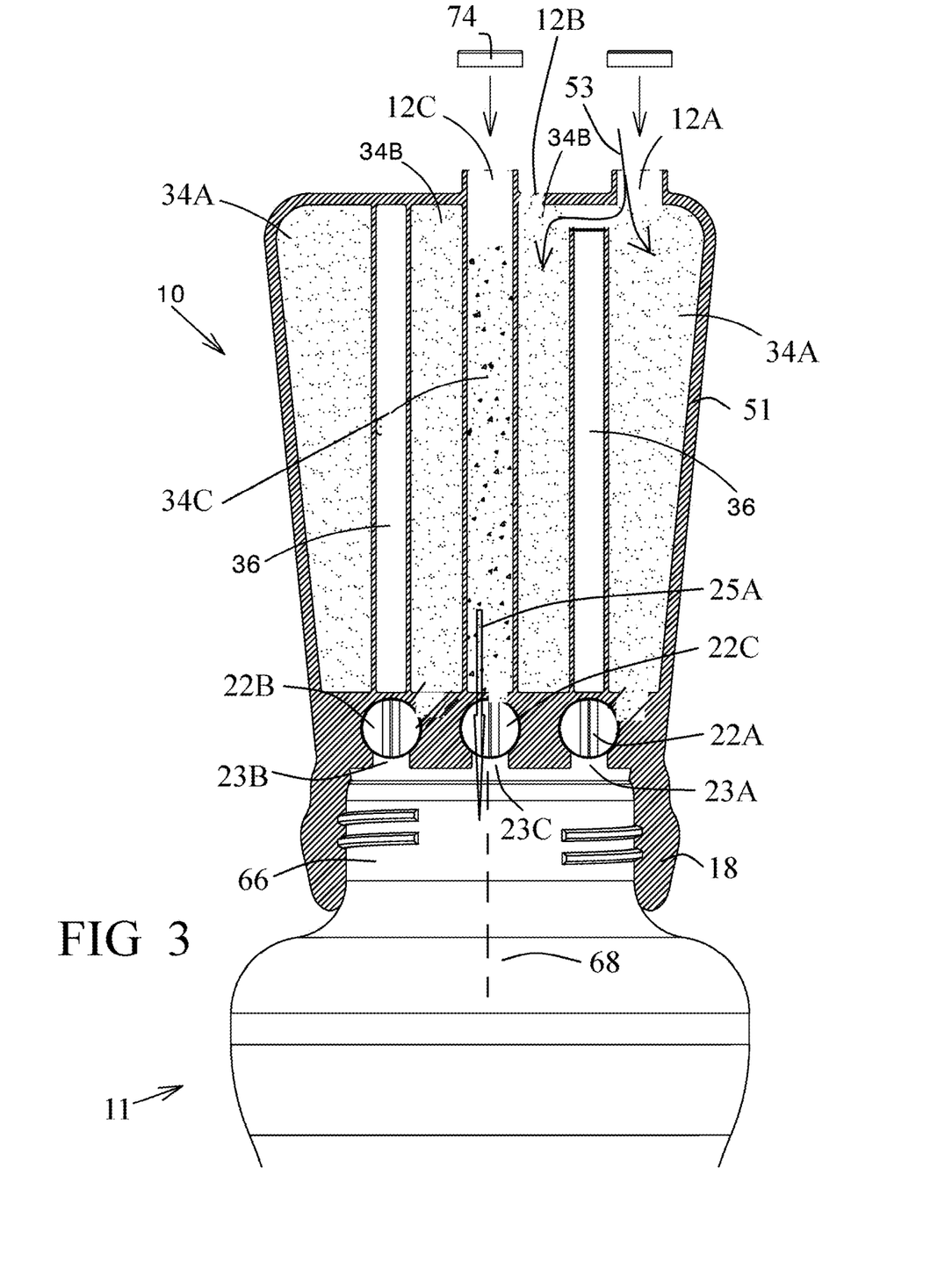
FIG. 3 is a front sectional view of the baby juice dispenser of FIG. 1, being connected to the baby bottle of FIG. 1.

FIG. 3 is a front sectional view of the baby juice dispenser of FIG. 1, being connected to the baby bottle of FIG. 1.

Complex tank 52 includes a powder tank 34C at the center having inlet 12C and a faucet 22C and an outlet 23C; a water tank 34B surrounding powder tank 34C and having inlet 12A or an inlet 12B, and having a faucet 22B and an outlet 23B; a thin air tank 36 surrounding water tank 34B and lacking an inlet and an outlet, thus water tank 34B and air tank 36 form together a thermos; and a water tank 34A surrounding air tank 36 and having inlet 12A and a faucet 22A and an outlet 23A.

Thus, water poured into inlet 12A falls (53) into water tanks 34A and 34B. Pouring boiling water into inlet 12A, fills both tanks at equal temperatures. Baby juice dispenser 10 is intended for pouring water immediately upon being boiled for dispensing it sterilized and warm.

External wall 51 of complex tank 52, thus of external water tank 34A is not heat insulated, thus the water of tank 34A loses its heat to the environment, thus naturally cools.

In contrast, water tank 34B is heat insulated by air tank 36 and by water tank 34A, thus air tank 36 maintains the water of tank 34B heated.

Figure 4:
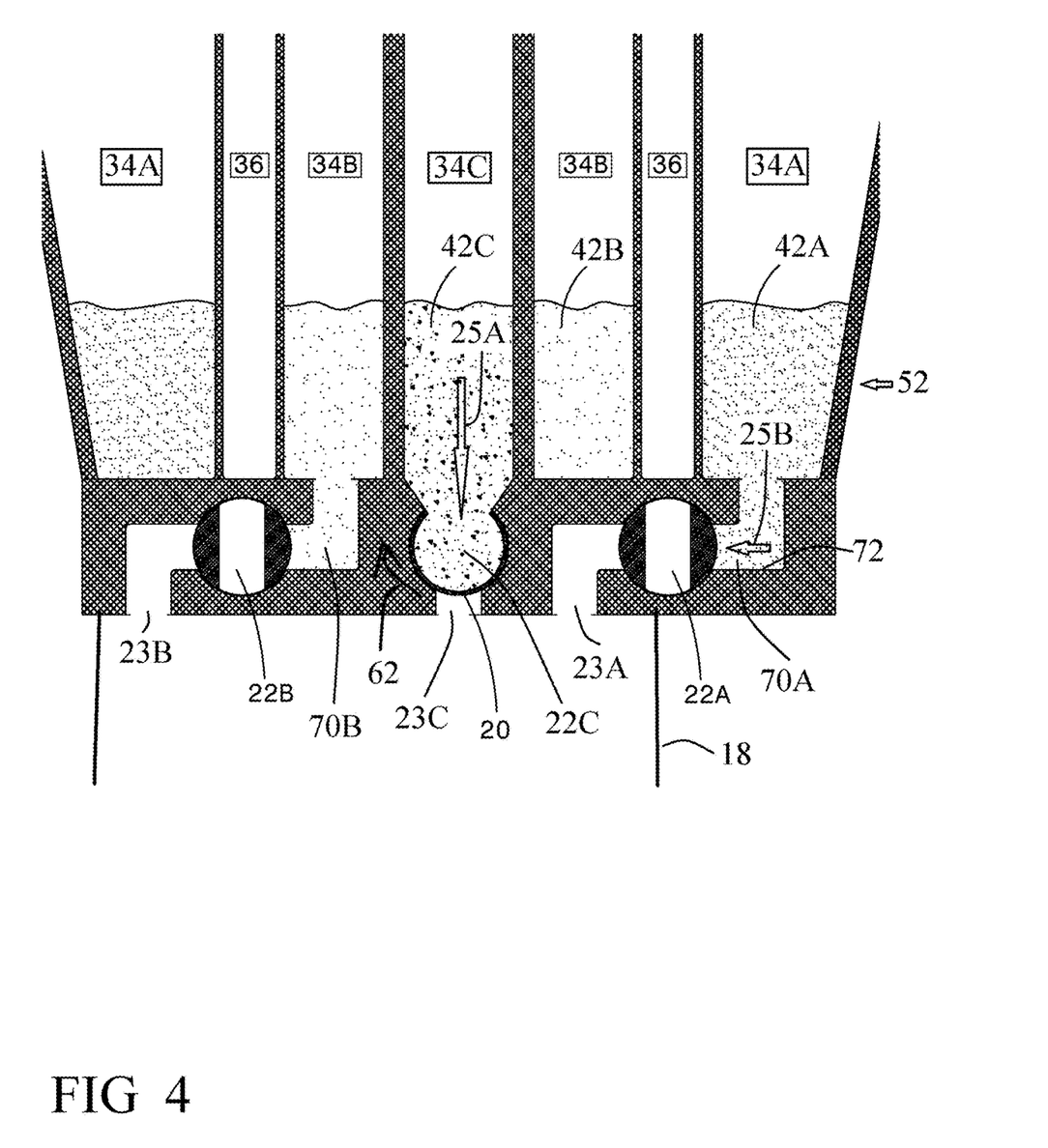
FIG. 4 is a front sectional view of the bottom of the baby juice dispenser of FIG. 1, while all faucets are closed.

FIG. 4 is a front sectional view of the bottom of the baby juice dispenser of FIG. 1, while all faucets are closed.

Outlet faucet 22C is disposed below powder tank 34C, between outlet faucets 22A and 22B. Thus, powder 42C falls directly by gravity by outlet faucet 22B.

Figure 5:
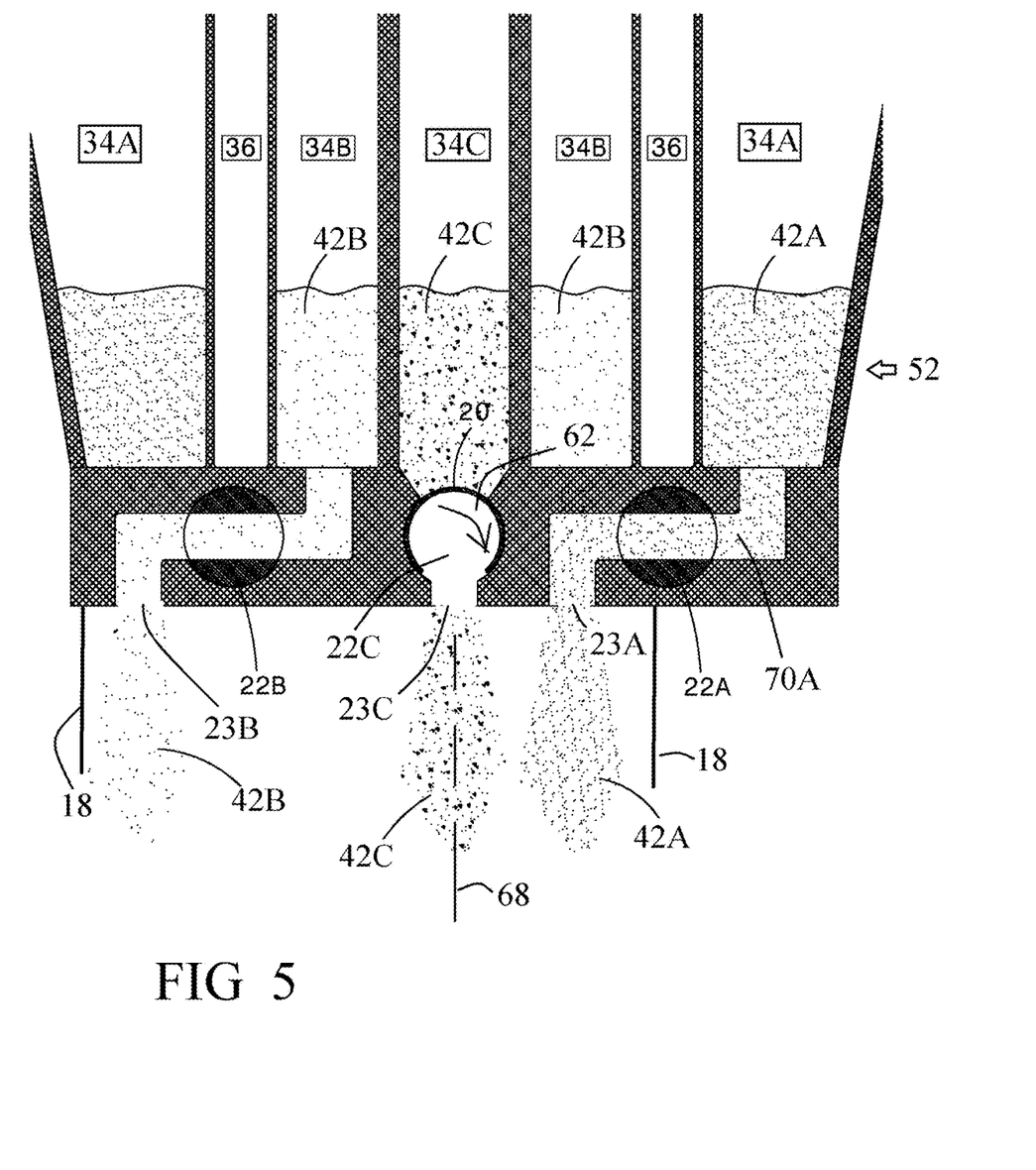
FIG. 5 is the front sectional view of FIG. 4, while all faucets are open.

FIG. 5 is the front sectional view of FIG. 4, while all faucets are open.

Outlet faucet 22C may include a rotatable (62) open cylinder 20, thus each 360 degrees rotation thereof pours one dose.

Referring again to FIG. 3, outlet 23C of powder tank 34C as being disposed at the center, as well is disposed above the center 68 of a neck 18 (FIG. 1) of complex tank 52, thus the powder is poured from powder tank 34C to bottle 11 directly by the gravity direction 25A.

Unlike powder tank 34C, water tank 34A as surrounding all the other tanks, might be disposed not above neck 18.

Thus, and referring again to FIG. 5, complex tank 52 may include a directing channel 70A, for directing water 42A from the bottom 72 of water tank 34A aside (25B) towards neck 18 of complex tank 52, providing outlet 23A to be disposed near center 68 of neck 18.

The operation is by inserting preferably 90-100 degrees C. of water into inlet 12A and inserting power into inlet 12B. Assuming the juice will be prepared 2 hours afterwards, the temperature of the water of tank 34A will up to then cool to 30 degrees C., and the temperature of the water of tank 34B will be 80 degrees C.

The user will then connect baby bottle 11 to baby juice dispenser 10, and adjustably opens faucets 22A and 22B for dispensing from tanks 34A and 34B into bottle 11, while sensing the temperature of the mixture 42D by touching the bottom of bottle 11 from outside. The user adjusts the opening of faucets 22A and 22B for obtaining the desired temperature. Then the user closes faucets 22A and 22B and opens faucet 23C for dispensing the powder. Then the user removes bottle 11 from baby juice dispenser 10.

This procedure ensures that the entire of the water has once been boiled, and that the dispensing is safe of spilling and sterilized. Tank 34A as well insulates tank 34B.

Figure 6:
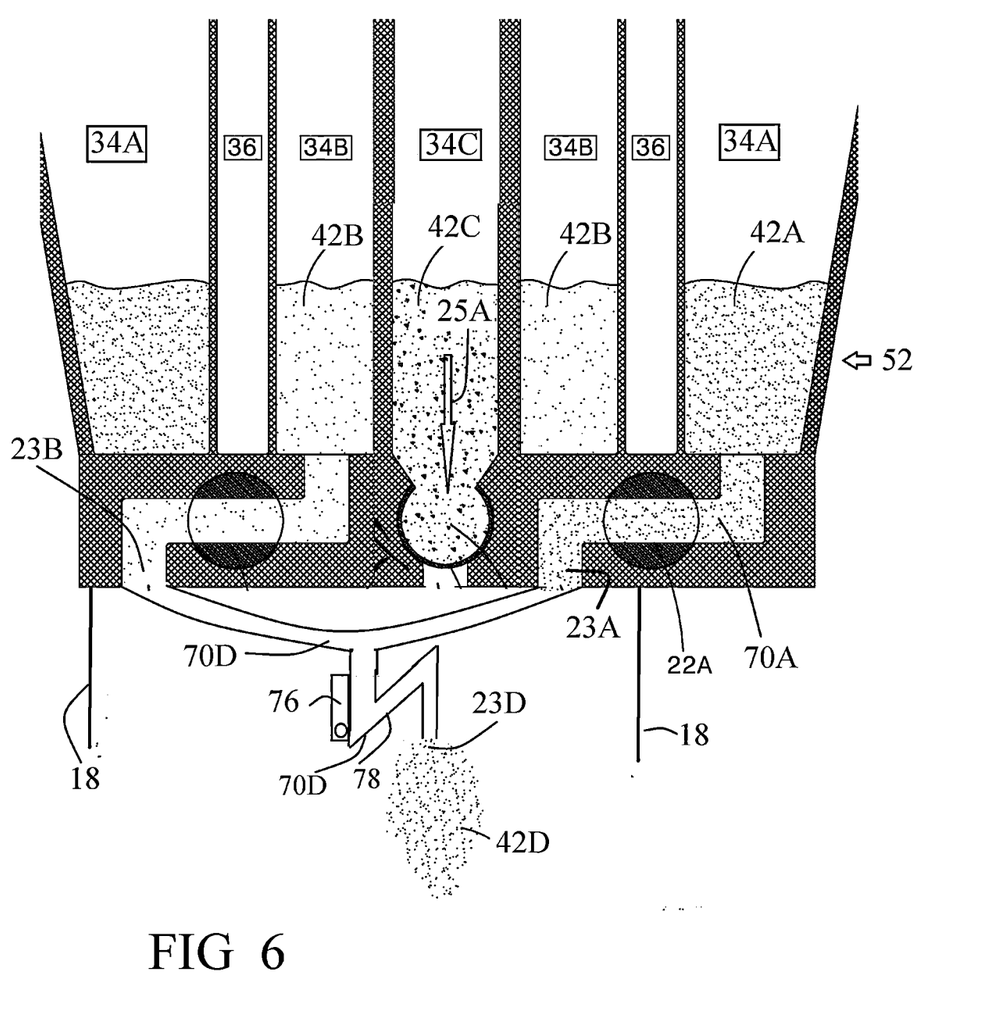
FIG. 6 is the front sectional view of the bottom of the baby juice dispenser of FIG. 1 according to another embodiment.

FIG. 6 is the front sectional view of the bottom of the baby juice dispenser of FIG. 1 according to another embodiment.

Complex tank 52 may further include channeling 70D for mixing water 42A with 42B, for allowing displaying the temperature of mixed water 42D by a thermometer 76, e.g., mercury thermometer, for guiding the user extent of opening each of faucets 22A and 22B.

Channeling 70D may include a labyrinth 78, for stabilizing the temperature measuring.

Thus, in one aspect, the invention is directed to a juice dispenser (10), including a first tank (34B) including a first inlet (12A), a first outlet (23A), and a first faucet (22B) for the first outlet (23A), and a second tank (34A) surrounding first tank (34B), and including a second inlet (12B), a second outlet (23B), and a second faucet (22B) for the second outlet (23B), thereby the second tank (34A) is not heat insulated, and the second tank (34A) insulates the first tank (34B) and thereby after inserting heated water into the tanks (34A, 34B), adjustable opening of the first faucet (22B) and second faucet (22A) dispenses the water to a receptacle (11) mixed at an adjustable temperature.

The first inlet (12A) and the second inlet (12B) may be a single inlet (12A), thereby the insertions of the heated water into the first (34B) and into the second tank (34A) are of equal water temperatures.

The juice dispenser (10) may further include a heat insulation layer (36), surrounding the first tank (34B) and being surrounded by the second tank (34A).

The heat insulation layer (36) may constitute a third tank, being air filled and being non-openable.

The juice dispenser (10) may further include a bottom neck (18), through which the first (23B) and second (23A) outlets dispense, the bottom neck (18) including a female thread (50B) fitted to a male thread (50A) of a baby bottle being the receptacle (11), thereby safely directing the adjustable temperature dispensing to the baby bottle (11).

The juice dispenser (10) may further include a horizontal channel (70A) extending between the first outlet (23B) and the bottom (72) of the second water tank (34A), thereby disposing the first outlet (23B) within the bottom neck (18).

The juice dispenser (10) may further include a fourth tank (34C) being surrounded by the first tank (34B), and including a third inlet (12C), a third outlet (23C), and a third faucet (22C) for the third outlet (23C).

The juice dispenser (10) may further include a bottom neck (18), thereby the third outlet (23C) preferably is disposed at the center (68) of the bottom neck (18), thereby the fourth tank (34C) dispenses content thereof to the center (68) of the bottom neck (18) along the gravity line (25A) only, thereby the dispensing is efficient for powder (42C).

The juice dispenser (10) may further include a thermometer (76), for displaying temperature of the mixed water (42D), thereby guiding the adjustability of the opening of the first (22B) and second (22A) faucets.

The juice dispenser (10) may further include channeling (70D) for mixing the water of the first outlet (23B) and of the second outlet (23A), and a labyrinth (78) disposed at an end of the channeling (70D), for stabilizing temperature of the mixed water (42D).

In the figures and/or description herein, the following reference numerals (Reference Signs List) have been mentioned:

numeral 10 denotes the baby juice dispenser according to one embodiment of the invention;
11: receptacle, such as baby bottle;
12A, 12B: water inlets;
12C: powder inlet;
18: neck of complex tank 52;
20: open cylinder, constituting faucet 22C;
22A, 22B: water faucets;
22C: powder faucet;
23A: outlet of water tank 34A;
23B: outlet of water tank 34B;
23C: powder outlet;
23D: mixed water outlet;
24: baby bottle cap;
25A: vertical gravity direction;
25B: horizontal water flow;
34A: external water tank;
34B: internal water tank;
34C: powder tank;
36: closed air thin tank;
42A: water of tank 34A;
42B: water of tank 34B;
42C: powder;
42D: mixture of water 42A and 42B;
50A: male thread of bottle 11;
50B: female thread of neck 18;
51: external wall;
52: complex tank;
53: water fall from inlet 12A;
62: rotation;
66: neck of baby bottle 11;
68: center of neck 18 of complex tank 52, being as well the center of neck 66 of baby bottle 11;
70A, 70B: horizontal water channels;
70D: channeling for mixing water 42A with water 42B;
72: bottom of water tank 34A;
74: cap;
76: thermometer;
78: labyrinth;

The foregoing description and illustrations of the embodiments of the invention have been presented for the purpose of illustration, and are not intended to be exhaustive or to limit the invention to the above description in any form.

Any term that has been defined above and used in the claims, should be interpreted according to this definition.

The reference numbers in the claims are not a part of the claims, but rather used for facilitating the reading thereof. These reference numbers should not be interpreted as limiting the claims in any form.

What is claimed is:

1. A juice dispenser, comprising:
   a first tank comprising a first inlet, a first outlet, and a first faucet for said first outlet; and a second tank surrounding said first tank, and comprising a second inlet, a second outlet, and a second faucet for said second outlet, thereby said second tank is not heat insulated, and said second tank insulates said first tank, and thereby after inserting heated water into said tanks, adjustable opening of said first and second faucets dispenses the water mixed at an adjustable temperature.

2. The juice dispenser according to claim 1, wherein said first inlet and said second inlet consist of a single inlet, thereby said insertions of said heated water into said first and into said second tank are of equal water temperatures.

3. The juice dispenser according to claim 1, further comprising a heat insulation layer, surrounding said first tank and being surrounded by said second tank.

4. The juice dispenser according to claim 3, wherein said heat insulation layer comprises a third tank, being air filled and being non-openable.

5. The juice dispenser according to claim 1, further comprising:
   a bottom neck, through which said first and second outlets dispense, said bottom neck comprising a female thread fitted to a male thread of a receptacle, thereby safely dispensing to said receptacle.

6. The juice dispenser according to claim 5, further comprising:
   a horizontal channel extending between said first outlet and a bottom of said second water tank, thereby disposing said first outlet within said bottom neck.

7. The juice dispenser according to claim 1, further comprising a fourth tank being surrounded by said first tank, and comprising a third inlet, a third outlet, and a third faucet for said third outlet.

8. The juice dispenser according to claim 7, further comprising a bottom neck,
   thereby said third outlet is disposed at a center (68) of said bottom neck,
   thereby said fourth tank dispenses content thereof to said center of said bottom neck along a gravity line only, thereby the dispensing is efficient for powder.

9. The juice dispenser according to claim 1, further comprising a thermometer for displaying temperature of said mixed water, thereby guiding said adjustability of said opening said first and second faucets.

10. The juice dispenser according to claim 1, further comprising:
   channeling for mixing the water of said first outlet and of said second outlet; and
   a labyrinth disposed at an end of said channeling, for stabilizing temperature of the mixed water.

\* \* \* \* \*